United States Patent [19]

Hüttlin

[11] 4,320,584

[45] Mar. 23, 1982

[54] FLUIDIZED BED APPARATUS

[76] Inventor: Herbert Hüttlin, Lörracher Strasse 14, 7853 Steinen, Fed. Rep. of Germany

[21] Appl. No.: 171,518

[22] Filed: Jul. 23, 1980

[30] Foreign Application Priority Data

Aug. 13, 1979 [DE] Fed. Rep. of Germany ....... 2932803

[51] Int. Cl.$^3$ .............................................. F26B 17/10
[52] U.S. Cl. .................................. 34/57 A; 34/57 D; 34/222; 432/58
[58] Field of Search ............. 34/57 A, 57 D, 10, 222, 34/229; 427/185; 118/303; 432/15, 58

[56] References Cited

U.S. PATENT DOCUMENTS 3,780,445 12/1973 Hansen ............................... 34/57 D
3,849,900 11/1974 Dale et al. ............................. 34/10

Primary Examiner—Larry I. Schwartz
Attorney, Agent, or Firm—Karl W. Flocks; A. Fred Starobin

[57] ABSTRACT

The invention relates to a fluidized bed apparatus, comprising a vessel in which a foraminous tray separates a treatment chamber from an air chamber disposed underneath the same, and a hollow rotor which is adapted to be driven in rotation and is connected to a blower and has at least one blade, rotating in the vicinity of the foraminous tray and provided with a gas outlet opening, and which leaves free part of the surface area of the foraminous tray.

8 Claims, 12 Drawing Figures

FLUIDIZED BED APPARATUS

BACKGROUND OF THE INVENTION

In a known fluidized bed apparatus of this kind (DE-OS No. 25 51 578, FIG. 5) the rotor comprises a four-blade impeller disposed directly above the foraminous tray. The individual blades each have a deflector face which rises toward the rear from a front lower edge, as seen in the direction of rotation, disposed a short distance above the foraminous tray, a rear wall which extends down from the upper end of the deflector face, and a blade bottom which interconnects the lower edges of the deflector face and the rear wall. The interior of each blade thus defined communicates with a hollow shaft of the rotor, which shaft is supported below the bottom and connected to the pressure end of a blower. The rear walls of the blades are perforated to permit the passage of drying air supplied by the blower into the treatment chamber above the foraminous tray. Directly below the foraminous tray there is a supply air chamber which is connectable to the pressure end of another blower so that additional drying air may flow upwards through the foraminous tray and between the blades of the rotor into the treatment chamber. The rate of flow is so adjustable that granular or pilular material in the treatment chamber will form a fluidized bed. A nozzle arranged above the fluidized bed or a plurality of nozzles installed in the blades may be used to spray liquid into the fluidized bed, for instance, for varnishing the material being treated.

With this known fluidized bed apparatus a relatively low flow rate, as compared with previously known means, is sufficient to dry granular material of the most varied kinds. Yet there are sensitive granular or pilular materials which dislike the direct action of the rotor blades such as seeds surrounded by peat or nutritive agents. On the other hand, not all types of material are suitable for treatment in a fluidized bed apparatus without a rotor since they may tend to form channels when a gas stream flows from the bottom through the foraminous tray and is uniformly carried through the material. The channel formation has the result that the gas quickly escapes from the top of the channels, leaving a major part of the material untouched. In that event a fluidized or turbulent bed in which all of the material is subjected to the turbulence cannot be obtained.

In another known fluidized bed apparatus (U.S. Pat. No. 3,849,900) in which likewise a foraminous tray separates a treatment chamber from an air chamber disposed underneath, a rotor including a circular orifice plate is disposed directly below the foraminous tray as a means to prevent the formation of channels. The orifice plate is provided with breakthroughs distributed either evenly or unevenly to let drying gas flow from the air chamber into the treatment chamber only through these breakthroughs and the foraminous tray disposed above the same. Thus the entire rate of flow of the gas is concentrated in one or more gas streams circulating in the treatment chamber in accordance with the speed of rotation of the rotor so that they are always forced to find new paths through the material. Therefore, no stationary channels can be established. However, the utilization of the heat capacity of the gas rising in more or less sharp streams through the material is far from complete. As is usual in fluidized bed apparatus, a filter is arranged above the treatment chamber and must be cleaned from time to time by vibration to remove the dust collected. During such vibration the dust falls into the treatment chamber where it may agglomerate undesirably with the material being treated so that the resulting product may be a granular material of very uneven size.

SUMMARY OF THE INVENTION

It is, therefore, the object of the invention to provide a fluidized bed apparatus of the kind defined initially which will permit careful treatment of sensitive material, at the same time, making full use of the gas flow provided for producing the fluidized bed and for drying the material.

This object is met, in accordance with the invention, in that the blade is disposed directly beneath the foraminous tray and its gas outlet is directed upwardly, and in that the air chamber is connected to the suction end of the blower.

Contrary to the known fluidized bed apparatus described above, the air chamber in accordance with the invention thus does not serve for supplying gas into the treatment chamber. Instead, the gas which the rotor has supplied through the foraminous tray into the treatment chamber is sucked off through the air chamber. In this way the gas is forced to flow twice through the material, once from the rotor through the foraminous tray and the material in upward direction and once through the material and the foraminous tray in downward direction into the air chamber. From the air chamber the gas which is more or less loaded with dust and moisture may be sucked off by a blower through a filter and, for instance, discharged into the atmosphere. It is also possible to return a great part of this gas by a short route through the rotor into the treatment chamber after having admixed dry gas. In both cases the gas which first has flown from the bottom to the top through the material where it may have entrained dust, is filtered to a certain extent by the material itself when it subsequently flows down through the material, giving the dust a chance to agglomerate on the material. It is readily possible to design the vessel such that the dust will have practically no chance to settle since the vessel does not require a filter above the treatment chamber or any gas outlet effective during normal operation. Therefore, it is easy to clean the vessel after a change of the charge, whereby the risk of material treated subsequently becoming contaminated with residues of previously treated material can be eliminated in simple manner.

Advantageous further developments of the invention may be gathered from the detailed description and drawings.

BRIEF DESCRIPTION OF THE DRAWINGS

Embodiments of the invention will be explained below with reference to diagrammatic drawings, in which.

DESCRIPTION OF THE PREFERRED EMBODIMENT

Figure 1:
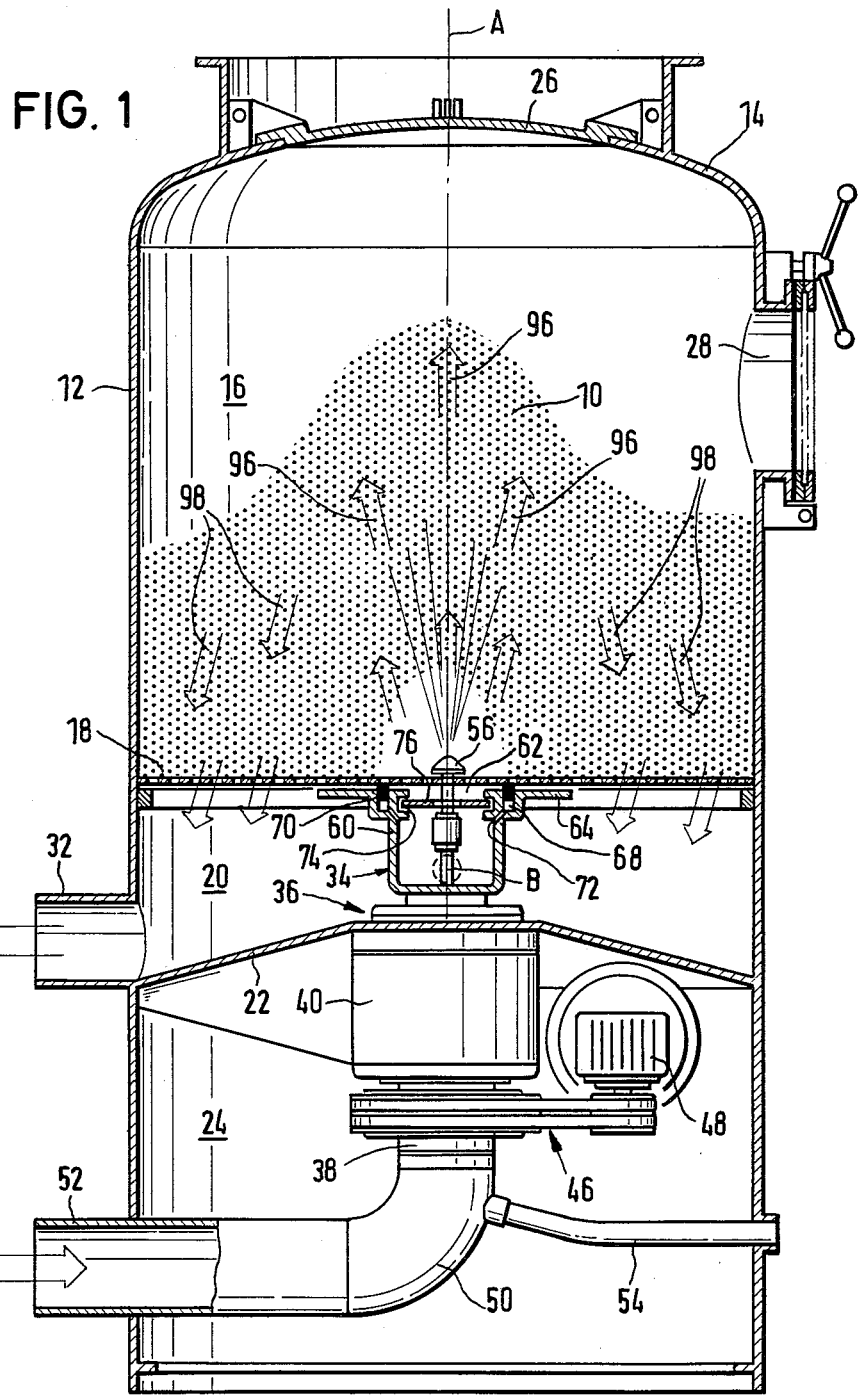
FIG. 1 is a vertical sectional view of a fluidized bed apparatus.

The function of the fluidized bed apparatus shown is to dry granular or pilular material which may have been impregnated, dyed, or provided with a varnish coat in the same apparatus. The apparatus comprises a substantially cylindrical vessel 12 with a vertical axis A and having a dome-shaped top 14. The vessel contains a treatment chamber 16 separated by a foraminous tray 18 from an air chamber 20 disposed underneath. The air chamber 20 is sealed tight from an engine room 24 by means of a frusto-conical intermediate bottom 22.

The dome-shaped top 14 comprises an explosion door 26. Slightly below the top 14 in the cylindrical part of the vessel 12 a charge and discharge opening 28 is provided which can be sealed tight. For charge and discharge, the entire vessel 12 may be swung about a horizontal pivot axis B which intersects the axis A of the vessel at right angles. For this purpose bearing pins 30 are arranged at the outside wall of the vessel 12.

As shown in FIG. 1, the air chamber 20 comprises a short suction pipe 32 adapted for connection to the suction end of a blower by way of a filter (not shown) which is arranged outside of the vessel 12. A pair of blades 34 of a rotor 36 are disposed in the air chamber 20 directly below the foraminous tray 18. The blades 34 are formed in one piece, extend diametrically through the vessel 12 and together have a length which is only a little smaller than the inner diameter of the vessel 12. The rotor 36 further includes a vertically arranged hollow shaft 38, at the upper end of which the blades 34 are fixed. The hollow shaft 38 is coaxial with the vessel 12, extends through the intermediate bottom 22 and through a bearing box 40 disposed beneath the same, and is supported in an axial bearing 42 and in two radial bearings 44. The lower end of the hollow shaft 38 is connected by a belt drive 46 with a geared motor 48 having an infinitely adjustable transmission ratio. An elbow 50 which is stationary in the vessel 12 opens into the lower end of the hollow shaft 38 and is adapted to be connected by an outwardly projecting short pressure pipe 52 with the pressure end of a blower not shown in FIG. 1. A liquid conduit 54 opens into the elbow 50, extends upwardly through the rotor 36 along the axis A and carries a spray nozzle 56 which is disposed directly above the foraminous tray 18.

The blades 34 are formed by a hollow body of U-shaped cross section comprising two essentially parallel legs 60 and between them an upwardly open gas outlet opening 62. A flange 64 extends latterally from each of the two legs 60 in parallel with the foraminous tray 18. The flanges 64 each leave free an area 66 of circular segment shape at the underside of the foraminous tray.

A groove 68 is formed between each leg 60 and the corresponding flange 64 to receive a sealing strip 79 which is adjustable in height. The bottom of each groove 68 communicates with the space between the two legs 60 through bores 72.

Figure 2:
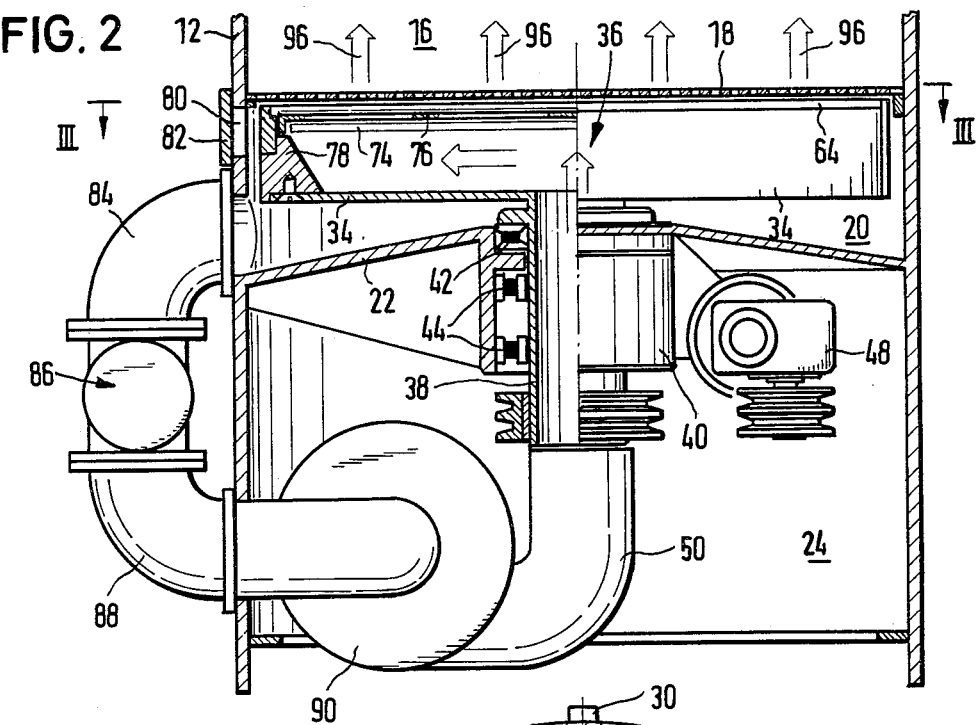
FIG. 2 shows the lower part of FIG. 1 with additional and modified details and with a rotor blade rotated 90° from its position shown in FIG. 1.
Figure 3:
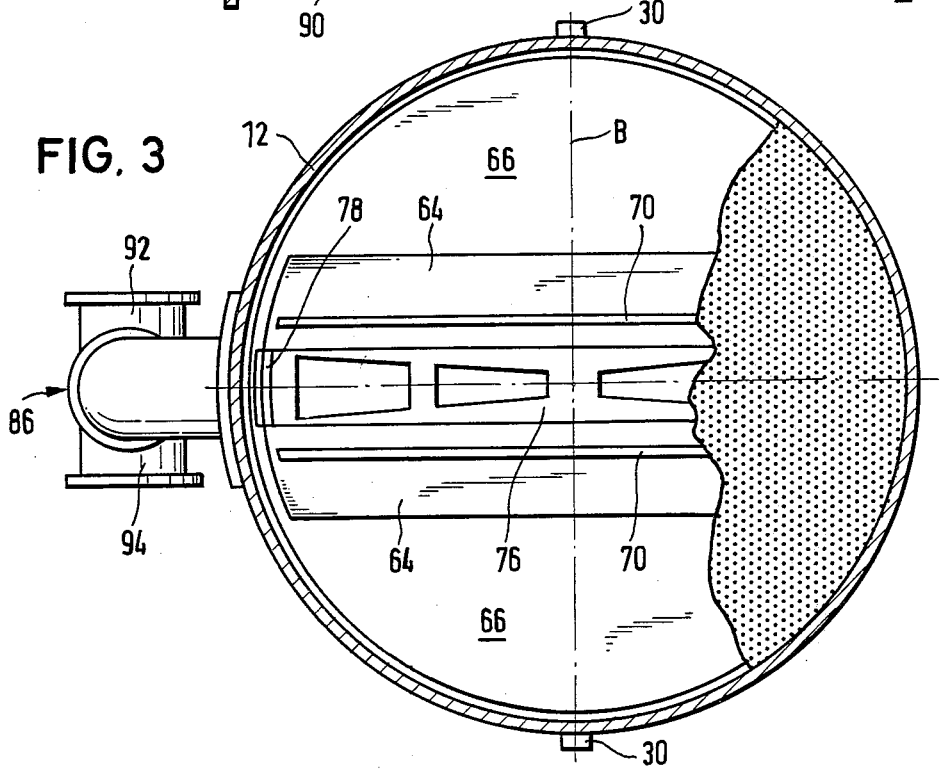
FIG. 3 is a horizontal sectional view taken on line III—III in FIG. 2, and FIGS. 4a to 4i show different embodiments of an orifice plate for use in an apparatus according to FIGS. 1 to 3.
Figure 4A:
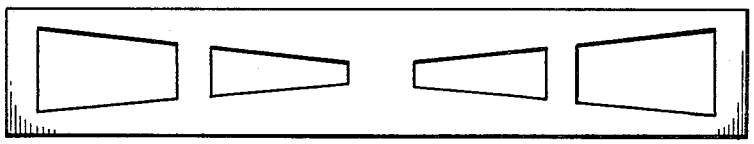
Figure 4B:
Figure 4C:
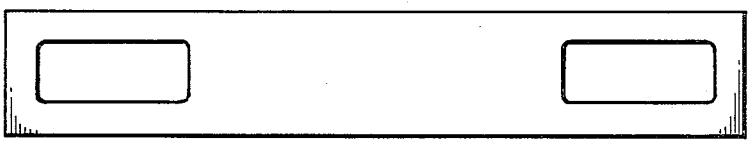
Figure 4D:
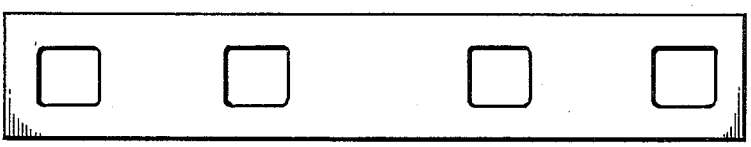
Figure 4E:
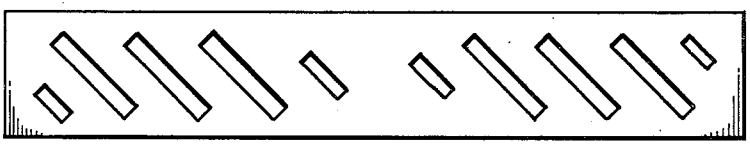
Figure 4F:
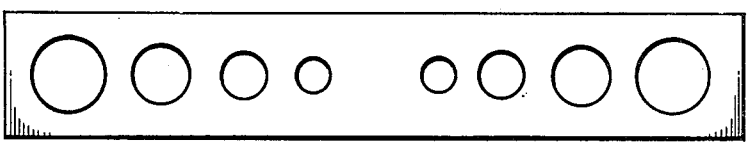
Figure 4G:
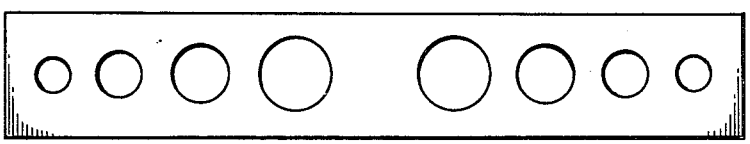
Figure 4H:
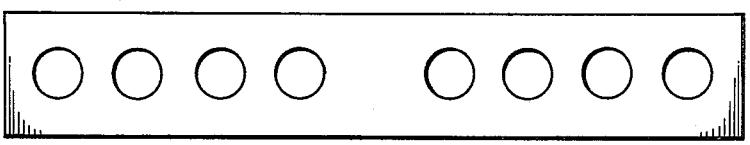
Figure 4I:
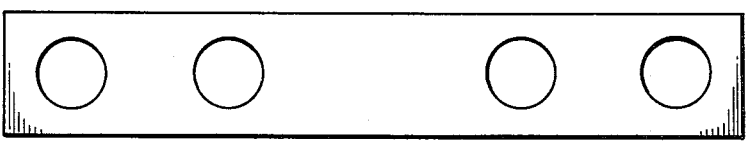

Furthermore, horizontal guide elements 74 into which an orifice plate 76 is inserted are formed at the inside of the two legs 60. In operation, the orifice plate 76 is prevented from any displacement by blocks 78 secured to the ends of the blades 34. The rotor 36 can be moved into a position in which its blades 34 are aligned with an opening 80 in the wall of the vessel 12 for exchange of the orifice plate 76, as shown in FIG. 2. In operation, the opening 80 is sealed tight by a cover 82.

Upon removal of the cover 82 the opposed block 78 may be disassembled or screwed off so that the orifice plate 76 can be pulled out of the guide elements 74 and replaced by another orifice plate.

When the spray nozzle 56 shown in FIG. 1 is provided, an exchange of the orifice plate 76 cannot be made until after the spray nozzle 56 has been removed which is readily possible when the treatment chamber 16 is empty since the charge and discharge opening 28 offers convenient access. Some suitable forms of exchangeable orifice plates 76 are shown in FIGS. 4a to 4i. Instead of the straight suction pipe 32 shown in FIG. 1 an elbow 84 may be provided, as shown in FIG. 2, which is connected by a four-way valve 86 and another elbow 88 to the suction end of a blower 90 installed in the engine room 24. The four-way valve 86 has a connection 92 for an exhaust air filter (not shown) and another connection 94 for a fresh air heater (likewise not shown).

When the fluidized bed apparatus is in operation, heated air or another gaseous drying medium is pressed upwardly through the hollow shaft 38 into the blades 34 of the rotor 36 where it is distributed in accordance with the design of the orifice plate 76 such that it flows more or less uniformly distributed over the entire length of the blades 34 in upward direction through the foraminous tray 18. The rotor 36 is rotated at selectable speed by the geared motor 48 so that the stream of the drying medium reaches the material 10 at constantly changing places, forming streams in the same which are mainly directed upwardly and have more or less strong radially outwardly directed components of flow, as indicated by arrows 96 in FIG. 1. By virtue of the low pressure caused by the blower 90 or another blower in the air chamber 20, the flow direction becomes inverted partly in the material and partly above the same, and the drying medium flows back through the material 10 and through the free circular segment shaped areas 66 of the foraminous tray 18 in downward direction, as indicated by arrows 98. During this time a liquid supplied through the liquid conduit 54 may be sprayed by spray nozzle 56 so as to be finely distributed in the material 10. The drying fluid flow in the direction of arrows 96 tends to entrain the liquid haze thus formed so as to warrant a particularly uniform and rapid distribution of the liquid in the material 10.

The bores 72 in the legs 60 guarantee that the undersides of the sealing strips 70 are always exposed to the pressure head which is formed at the underside of the orifice plate 76 since the gaseous drying medium exits at relatively high speed from the hollow shaft 38 and is closed up at the underside of the orifice plate 76. The upper sides of the sealing strips 70, on the other hand, are exposed to lesser pressure. Consequently, in operation the sealing strips 70 are always pressed uniformly in upward direction against the underside of the foraminous tray 18 so that the drying gas leaving the rotor 36 is compelled to flow in upward direction through the foraminous tray 18 and cannot enter the air chamber 20 directly, or to a very little extent only.

The flanges 64 further prevent the drying gas stream from turning back directly above the foraminous tray 18 to reach the air chamber 20 by a short route. If the flanges 64 are sufficiently wide and their spacing from the foraminous tray 18 is small, and if, furthermore, the flow resistance of the foraminous tray 18 is not too great, the sealing strips 70 may be dispensed with. On the other hand, the flanges 64 are dispensable if the gaseous drying medium issuing from the rotor 36 has a sufficiently high speed in upward direction so as to penetrate the material 10 completely under any circumstances. In this case, too, the sealing strips 70 may be dispensed with, provided the upper edges of the legs 60 are at a little spacing from the foraminous tray 18.

The plane foraminous tray 18 shown may also be replaced by an upwardly or downwardly arcuate or by a conical foraminous tray if the kind of material to be treated recommends such shapes. In this case also the blades 34 of the rotor 36 have a corresponding curvature and are arranged in V-shape or like arrows so that they are closely adapted to the underside of the foraminous tray.

What we claim is:

1. A fluidized bed apparatus comprising
   a vessel,
   a treatment chamber in said vessel,
   an air chamber in said vessel below said treatment chamber,
   a foraminous tray between and separating said treatment chamber from said air chamber,
   a hollow rotor having means for rotating said rotor and having at least one blade located for rotation in close proximity to and below said foraminous tray, said at least one blade having a gas outlet opening upwardly,
   blower means having an air pressure end and a suction end at opposite operative ends of said blower means, said air pressure end operatively connected to said gas outlet, and said suction end operatively connected to said air chamber,
   said at least one blade occupying only a portion of the area beneath said foraminous tray with another portion of the area of said foraminous tray connecting said treatment chamber with said air chamber.

2. The fluidized bed apparatus of claim 1, further characterized by
   said blower means including a single blower with said air pressure end connected through said hollow rotor to said blade and said gas outlet.

3. The fluidized bed apparatus of claim 1, further characterized by
   a sealing strip on at least two sides of said gas outlet in said blade in sealing engagement with the underside of said foraminous tray.

4. The fluidized bed apparatus of claim 3, further characterized by
   said blade having grooves within which said sealing strips are guided and displaceable in height and having bores connecting the bottom of said grooves to the interior of said rotor.

5. The fluidized bed apparatus of claims 1, 2, 3, or 4, further characterized by
   a flange on each of two sides of said gas outlet of said blade, each said flange extending in parallel with said foraminous tray and with said flanges covering only a portion of the surface under said foraminous tray and the remaining portions of the surface of said foraminous tray in the shape of circular segments connecting said treatment chamber with said air chamber.

6. The fluidized bed apparatus of claims 1, 2, 3, or 4, further characterized by
   an orifice plate partly closing said gas outlet of said blade.

7. The fluidized bed apparatus of claim 6, further characterized by
   said rotor having a U-shaped cross-section including two lateral legs having guide elements at their ends formed for diametrical insertion of said orifice plate.

8. The fluidized bed apparatus of claim 7, further characterized by
   said vessel having a closable opening at the level of said blade for insertion of said orifice plate.

* * * * *